United States Patent
Dinc et al.

(10) Patent No.: US 10,090,585 B2
(45) Date of Patent: Oct. 2, 2018

(54) CIRCUITS AND METHODS FOR ANTENNA-BASED SELF-INTERFERENCE CANCELLATION

(71) Applicants: Tolga Dinc, New York, NY (US); Harish Krishnaswamy, New York, NY (US)

(72) Inventors: Tolga Dinc, New York, NY (US); Harish Krishnaswamy, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 213 days.

(21) Appl. No.: 15/244,869

(22) Filed: Aug. 23, 2016

(65) Prior Publication Data

US 2017/0054224 A1    Feb. 23, 2017

Related U.S. Application Data

(60) Provisional application No. 62/208,803, filed on Aug. 23, 2015.

(51) Int. Cl.
*H01Q 1/38* (2006.01)
*H04W 16/14* (2009.01)
(Continued)

(52) U.S. Cl.
CPC ............. *H01Q 1/38* (2013.01); *H01Q 1/525* (2013.01); *H01Q 5/314* (2015.01); *H01Q 21/06* (2013.01); *H04B 1/06* (2013.01); *H04W 16/14* (2013.01)

(58) Field of Classification Search
CPC combination set(s) only.
See application file for complete search history.

(56) References Cited

U.S. PATENT DOCUMENTS

| 3,304,519 A | 2/1967 | Weiss |
| 4,061,905 A | 12/1977 | Fettweis |

(Continued)

FOREIGN PATENT DOCUMENTS

| WO | WO2014027231 | 2/2014 |
| WO | WO 2017/139012 | 8/2017 |

OTHER PUBLICATIONS

Sabharwal, A., Schniter, P., Guo, D., Bliss, D.W., Rangarajan, S. and Wichman, R., 2014. In-band full-duplex wireless: Challenges and opportunities. IEEE Journal on selected areas in communications, 32(9), pp. 1637-1652.*

(Continued)

*Primary Examiner* — Yuwen Pan
*Assistant Examiner* — Zhitong Chen
(74) *Attorney, Agent, or Firm* — Byrne Poh LLP (57) ABSTRACT

Circuits and methods for antenna-based self-interference cancellation are provided. In some embodiments, circuits for antenna-based self-interference cancellation are provided, the circuits comprising: a transmit antenna having a transmit port that receives a transmit signal; a receive antenna having a receive port that is cross-polarized with respect to the transmit port and having an auxiliary port that is co-polarized with respect to the transmit port; and a termination connected to the auxiliary port that reflects a signal received at the auxiliary port as a reflected signal, wherein the reflected signal counters interference caused by the transmit signal at the receive port.

8 Claims, 9 Drawing Sheets

(51) Int. Cl.

| H04B 1/06 | (2006.01) |
|---|---|
| H01Q 21/06 | (2006.01) |
| H01Q 1/52 | (2006.01) |
| H01Q 5/314 | (2015.01) |

(56) References Cited

U.S. PATENT DOCUMENTS

| 4,079,377 A | 3/1978 | Zur Heiden et al. |
|---|---|---|
| 4,641,365 A | 2/1987 | Montini, Jr. |
| 5,608,361 A | 4/1997 | Weiss et al. |
| 5,760,740 A * | 6/1998 | Blodgett .............. H01Q 19/028 342/362 |
| 6,141,571 A | 10/2000 | Dionne |
| 7,778,611 B2 | 8/2010 | Asai et al. |
| 7,817,641 B1 | 10/2010 | Khandani |
| 8,155,602 B2 | 4/2012 | Ziaei et al. |
| 8,576,752 B2 | 11/2013 | Sarca |
| 8,829,973 B2 | 9/2014 | Sander |
| 8,868,006 B2 | 10/2014 | Cox et al. |
| 9,054,406 B2 | 6/2015 | Ueda et al. |
| 9,197,170 B2 | 11/2015 | Corman et al. |
| 9,203,455 B2 | 12/2015 | Yang et al. |
| 9,319,210 B2 | 4/2016 | Choi et al. |
| 9,325,432 B2 | 4/2016 | Hong et al. |
| 9,337,885 B2 | 5/2016 | Mehlman et al. |
| 2003/0179137 A1* | 9/2003 | White .................... H01Q 1/521 342/361 |
| 2009/0247074 A1 | 10/2009 | Cox et al. |
| 2010/0109791 A1 | 6/2010 | Lingel |
| 2013/0241669 A1 | 9/2013 | Mikhemar et al. |
| 2013/0343235 A1 | 12/2013 | Khan |
| 2015/0016309 A1 | 1/2015 | Fang et al. |
| 2015/0030280 A1 | 1/2015 | Alu et al. |
| 2015/0055568 A1 | 2/2015 | Jindal et al. |
| 2015/0156004 A1* | 6/2015 | Khandani .............. H04L 5/1423 370/278 |
| 2015/0188646 A1 | 7/2015 | Bharadia et al. |
| 2015/0207537 A1 | 7/2015 | Cox et al. |
| 2016/0087823 A1 | 3/2016 | Wang |
| 2017/0339569 A1* | 11/2017 | Khandani .............. H04W 12/04 |

OTHER PUBLICATIONS

Wegener, A.T. and Chappell, W.J., Jun. 2012, Simultaneous transmit and receive with a small planar array. In Microwave Symposium Digest (MTT), 2012 IEEE MTT-S International (pp. 1-3). IEEE.*
International Search Report and Written Opinion dated Aug. 14, 2017 in International Patent Application No. PCT/US2016/065456.
Notice of Allowance dated Aug. 11, 2017 in U.S. Appl. No. 15/391,292.
Abdelhalem et al., "Tunable CMOS Integrated Duplexer with Antenna Impedance Tracking and High Isolation in the Transmit and Receive Bands", in IEEE Transactions on Microwave Theory and Techniques, vol. 62, issue 9, Sep. 2014, pp. 2092-2104.
Adam et al., "Ferrite Devices and Materials", in IEEE Transactions on Microwave Theory and Technology, vol. 50, issue 3, Mar. 2002, pp. 721-737.
Adam et al., "Monolithic Integration of an X-Band Circulator with GaAs MMICs", in the Proceedings of the IEEE International Microwave Symposium, Orlando, FL, US, May 16-20, 1995, pp. 97-98.
Andrews et al., "Implications of Passive Mixer Transparency for Impedance Matching and Noise Figure in Passive Mixer-First Receivers", in IEEE Transactions on Circuits and Systems, vol. 57, issue 12, Dec. 2010, pp. 3092-3103.
Aparin et al., "An Integrated LMS Adaptive Filter of TX Leakage for CDMA Receiver Front Ends", in IEEE Journal of Solid-State Circuits, vol. 41, No. 5, Apr. 2006, pp. 1171-1182.
Aryafar et al., "MIDU: Enabling MIMO Full Duplex", in Proceedings of the 18th Annual International Conference on Mobile Computing and Networking, Istanbul, TR, Aug. 2012, pp. 257-268.

Ayati et al., "Adaptive Integrated CMOS Circulator", in the Proceedings of the IEEE Radio Frequency Integrated Circuits Symposium, San Francisco, CA, US, May 22-24, 2016, pp. 146-149.
Bharadia et al., "Full Duplex Radios", in ACM SIGCOMM Computer Communication Review, vol. 43, No. 4, Oct. 2013, pp. 375-386.
Bi et al., "On-Chip Optical Isolation in Monolithically Integrated Non-Reciprocal Optical Resonators", in Nature Photonics, issue 5, Jun. 15, 2011, pp. 758-762.
Boers et al., "A 16TX/16RX 60 GHz 802.1 1AD Chipset with Single Coaxial Interface and Polarization Diversity", in IEEE Journal of Solid State Circuits, vol. 49, No. 12, Dec. 2014, pp. 3031-3045.
Busignies et al., "Some Relations Between Speed of Indication, Bandwidth, Signal-to-Random-Noise Ratio in Radio Navigation and Direction Finding", in the Proceedings of the IRE, vol. 37, No. 5, May 1949, pp. 478-488.
Carchon et al., "Power and Noise Limitations of Active Circulators", in IEEE Transaction on Microwave Theory and Techniques, vol. 48, issue 2, Feb. 2000, pp. 316-319.
Caster et al., "A 93-to-113 GHz BiCMOS 9-Element Imaging Array Receiver Utilizing Spatial-Overlapping Pixels with Wideband Phase and Amplitude Control", in the Proceedings of the IEEE Solid-State Circuits Conference, San Francisco, CA, US, Feb. 2013, 144-145.
Chakrabarti et al., "Design Considerations for Stacked Class-E-like mmWave Power DACs in CMOS", in the Proceedings of the IEEE International Microwave Symposium, Seattle, WA, US, Jun. 2013, pp. 1-4.
Chakrabarti et al., "High-Power, High-Efficiency, Class-E-like, Stacked mmWave PAs in SOI and Bulk CMOS: Theory and Implementation", in IEEE Transactions on Microwave Theory and Techniques, vol. 62, No. 8, Aug. 2014, pp. 1686-1704.
Chang et al., "Design and Analysis of 24-GHz Active Isolator and Quasi-Circulator", in IEEE Transactions on Microwave Theory and Techniques, vol. 63, No. 8, Aug. 2015, pp. 2638-2649.
Choi et al., "Achieving Single Channel, Full Duplex Wireless Communication", in the Proceedings of MobiCom, Chicago, IL, US, Sep. 2010, pp. 1-12.
Choi et al., "Full-Duplex Wireless Design", Stanford.edu, Nov. 2014, pp. 1-4, available at: http://sing.stanford.edu/fullduplex/.
Debaillie et al., "Analog/RF Solutions Enabling Compact Full-Duplex Radios", in IEEE Journal of Selected Areas of Communication, vol. 32, No. 9, Sep. 2014, pp. 1662-1673.
Dinc et al., "A 60GHz Same-Channel Full-Duplex CMOS Transceiver and Link Based on Reconfigurable Polarization-Based Antenna Cancellation", in the Proceedings of the IEEE Radio Frequency Integrated Circuits Symposium, Phoenix, AZ, US, May 2015, pp. 1-4.
Dinc et al., "A T/R Antenna Pair with Polarization-Based Reconfigurable Wideband Self-Interference Cancellation for Simultaneous Transmit and Receive", in the Proceedings of the IEEE International Microwave Symposium, Phoenix, AZ, US, May 2015, pp. 1-4.
Dinc et al., "CoSMIC 60 GHz Same-Channel Full-Duplex Transceiver Demo", YouTube, Mar. 2015, pp. 1-2, available at: https://youtube/9QA3euzT1HU.
Dinc et al., "CoSMIC 60 GHz Same-Channel Half-Duplex Transceiver Demo", YouTube, May 2015, pp. 1-2, available at: https://youtube/UMfkuqYNuyE.
Doerr et al., "Silicon Photonics Broadband Modulation-Based Isolator", in Optics Express, vol. 22, Feb. 20, 2014, pp. 4493-4498.
Duarte et al., "Full-Duplex Wireless Communications Using Off-the-Shelf Radios: Feasibility and First Results", in Conference Record of ASILOMAR, Nov. 2010, pp. 1558-1562.
Edwards et al., "High-Efficiency Silicon RFIC Millimeter-Wave Elliptical Slot-Antenna with a Quartz Lens", in the Proceedings of the IEEE International Symposium on Antennas and Propagation, Spokane, WA, US, Jul. 2011, pp. 899-902.
Elkholy et al., "Low-Loss Integrated Passive CMOS Electrical Balance Duplexers with Single-Ended LNA", in IEEE Transactions on Microwave Theory and Techniques, vol. 64, issue 5, May 2016, pp. 1544-1559.
Emami et al., "A 60 GHz CMOS Phase-array Transceiver Pair for Multi-Gb/s Wireless Communications", in the Proceedings of the (56) References Cited

OTHER PUBLICATIONS

IEEE International Solid-State Circuits Conference, San Francisco, CA, US, Feb. 2011, pp. 164-166.
Estep et al., "Magnetic-Free Non-Reciprocity and Isolation Based on Parametrically Modulated Coupled-Resonator Loops", in Nature Physics, vol. 10, Nov. 2014, pp. 923-927.
Estep et al., "Magnetless Microwave Circulators Based on Spatiotemporally Modulated Rings of Coupled Resonators", in IEEE Transactions on Microwave Theory and Techniques, vol. 64, No. 2, Feb. 2016, pp. 502-518.
Estep et al., "On-Chip Non-Reciprocal Components Based on Angular-Momentum Biasing", in the Proceedings of the IEEE International Microwave Symposium, Phoenix, AZ, US, May 2015, pp. 1-4.
Everett et al., "Passive Self-Interference Suppression for Full-Duplex Infrastructure Nodes", in IEEE Transactions on Wireless Communications, vol. 13, No. 2, Feb. 2013, pp. 680-694.
Fan et al., "An All-Silicon Passive Optical Diode", in Science, vol. 335, issue 6067, Jan. 2012, pp. 447-450.
Fleury et al., "Sound Isolation and Giant Linear Non-Reciprocity in a Compact Acoustic Circulator", in Science, vol. 343, issue 6170, Jan. 31, 2014, pp. 516-519.
Forbes et al., "Design and Analysis of Harmonic Rejection Mixers with Programmable LO Frequency", in IEEE Journal of Solid-State Circuits, vol. 48, issue 10, Oct. 2013, pp. 2363-2374.
Galland et al., "On-Chip Optical Non-Reciprocity Using Phase Modulators", in Optics Express, vol. 21, Jun. 2013, pp. 14500-14511.
Gallo et al, "All-Optical Diode in A Periodically Poled Lithium Niobate Waveguide", in Applied Physics Letters, vol. 79, No. 3, Jul. 16, 2001, pp. 314-316.
Ghaffari et al., "Tunable High-Q N-Path Band-Pass Filters: Modeling and Verification", in IEEE Journal of Solid-State Circuits, vol. 46, No. 5, Apr. 2011, pp. 998-1010.
Gharpurey, R., "Linearity Enhancement Techniques in Radio Receiver Front-Ends", in IEEE Transactions on Circuits and Systems, vol. 59, issue 8, Aug. 2012, pp. 1667-1679.
Goel et al., "Tunable Duplexer with Passive Feed-Forward Cancellation to Improve the RX-TX Isolation", in IEEE Transactions on Circuits and Systems, vol. 62, No. 2, Feb. 2015, pp. 536-544.
Gompa, N., "Full Duplex: A Fundamental Radio Tech Breakthrough That Could Double Throughput, Alleviate The Spectrum Crunch", ExtremeTech, Aug. 2014, pp. 1-9.
Guermandi et al., "A 79 GHz Binary Phase-Modulated Continuous-Wave Radar Transceiver with TX-to-RX Spillover Cancellation in 28 nm CMOS", in the Proceedings of the IEEE International Solid State Circuits Conference, San Francisco, CA, US, Feb. 2015, pp. 354-355.
Hong et al., "Applications of Self-Interference Cancellation in 5G and Beyond", in IEEE Communications Magazine, vol. 52, issue 2, Feb. 2014, pp. 114-121.
Jain et al., "A Single-Chip Dual-Band 22-20-Ghz/77-81-GHz BiCMOS Transceiver for Automotive Radars", in IEEE Journal of Solid-State Circuits, vol. 44, No. 12, Dec. 2009, pp. 3469-3485.
Jalas el al., "What Is—And What Is Not—An Optical Isolator", in Nature Photonics, issue 7, Jul. 30, 2013, pp. 579-582.
Kamal et al., "Noiseless Non-Reciprocity in a Parametric Active Device", in Nature Physics, vol. 7, Jan. 30, 2011, pp. 311-315.
Kang et al., "Reconfigurable Light-Driven Opto-Acoustic Isolators in Photonic Crystal Fibre", in Nature Photonics, vol. 5, Sep. 2011, pp. 549-553.
Khandani, A., "Two-way (true full-duplex) wireless," in Canadian Workshop on Information Theory (CWIT), Jun. 2013, pp. 33-38.
Khanikaev et al., "Topologically Robust Sound Propagation in an Angular-Momentum-Biased Graphene-Like Resonator Lattice", in Nature Communications, vol. 6, Oct. 2015, pp. 1-7.
Kim et al., "A Passive Circulator with High Isolation Using a Directional Coupler for RFID", in the Proceedings of the IEEE International Microwave Symposium, San Francisco, CA, US, Jun. 11-16, 2006, pp. 1177-1180.

Knox, M.E., "Single Antenna Full Duplex Communications using a Common Carrier", in the Proceedings of IEEE WAMICON, Apr. 2012, pp. 1-6.
Kodera et al., "Artificial Faraday Rotaion Using a Ring Metamaterial Structure Without Static Magnetic Field", in Applied Physics Letters, vol. 99, Jun. 2011, pp. 1-3.
Kodera et al., "Magnetless NonReciprocal Metamaterial Technology: Application to Microwave Components", in IEEE Transactions on Microwave Theory and Techniques, vol. 61, No. 3, Mar. 2013, pp. 1030-1042.
Kolodziej et al., "Ring Array Antenna with Optimized Beamformer for Simultaneous Transmit and Receive", in IEEE Antennas and Propagation Society International Symposium, Chicago, IL, US, Jul. 2012, pp. 1-2.
Kosugi et al., "MM-Wave Long-Range Wireless Systems", in IEEE Microwave Magazine, vol. 10, No. 2, Apr. 2009, pp. 68-76.
Laughlin et al., "Passive and Active Electrical Balance Duplexers", in IEEE Transactions on Circuits and Systems, vol. 63, issue 1, Sep. 25, 2015, pp. 94-98.
LePage et al., "Analysis of a Comb Filter Using Synchronously Commutated Capacitors", in Transactions of the American Institute of Electrical Engineers, vol. 72, issue 1, Mar. 1953, pp. 63-68.
Li et al., "A Fully Integrated 77 GHz FMCW Radar System in 65 nm CMOS", in the Proceedings of the IEEE International Solid-State Circuits Conference, San Francisco, CA, US, Feb. 2010, pp. 216-217.
Lira et al., "Broadband Hitless Silicon Electro-Optic Switch for On-Chip Optical Networks", in Optics Express, vol. 17, issue 25, pp. 22271-22280.
Lira et al., "Electrically Driven Nonreciprocity Induced by Interband Photonic Transition on a Silicon Chip", in Physical Review Letters, vol. 109, Jul. 20, 2012, pp. 1-5.
Mahmoud et al., "All-Passive Nonreciprocal Metastructure", in Nature Communications, vol. 6, Sep. 28, 2015, pp. 1-7.
Marasevic et al., "Resource Allocation and Rate Gains in Practical Full-Duplex Systems", in IEEE/ACM Transactions on Networking, vol. 25, issue 1, Feb. 2017, pp. 292-305.
Mikhemar et al., "A Multiband RF Antenna Duplexer on CMOS: Design and Performance", in the IEEE Journal of Solid-State Circuits, vol. 48, No. 9, Sep. 2013, pp. 2067-2077.
Mirzaei et al., "Reconfigurable RF Front-Ends for Cellular Receivers", in the Proceedings of the Compound Semiconductor Integrated Circuit Symposium, Monteray, CA, US, Oct. 3-6, 2010, pp. 1-4.
Moulder et al., "Wideband Antenna Array for Simutaneous Transmit and Receive (STAR) Applications", in IEEE Antennas and Propagation Society International Symposium, Memphis, TN, US, Jul. 2014, pp. 243-244.
Natarajan et al., "A Fully-Integrated 16-Element Phased-Array Receiver in SiGe BiCMOS for 60-GHz Communications", in IEEE Journal of Solid-State Circuits, vol. 46, No. 5, May 2011, pp. 1059-1075.
Natarajan et al., "W-Band Dual-Polarizatoin Phased-Array Transeiver Front-end in SiGe BiCMOS", in IEEE Transactions on Microwave Theory and Technology, vol. 63, No. 6, Jun. 2015, pp. 1989-2002.
Office Action dated Apr. 3, 2017 in U.S. Appl. No. 15/391,292.
Okada et al., "Full Four-Channel 6.3-Gb/s 60-GHz CMOS Transceiver with Low-Power Analog and Digital Baseband Circuitry", in IEEE Journal of Solid-State Circuits, vol. 48, No. 1, Jan. 2013, pp. 46-65.
Oliver et al., "A Monolithic Single-Crystal Yttrium Iron Garnet/Silicon X-Band Circulator", in IEEE Microwave Guided Wave Letters, vol. 7, issue 8, Aug. 1997, pp. 239-241.
Peng et al., "Parity-Time-Symmetric Whispering-Gallery Microactivites", in Nature Physics, issue 10, Sep. 2013, pp. 394-398.
Qin et al., "Nonreciprocal Components with Distributedly Modulated Capacitors", in IEEE Transactions on Microwave Theory and Techniques, vol. 62, No. 10, Oct. 2014, pp. 2260-2272.
Razavi et al., "A 60-GHz CMOS Receiver Front End", in IEEE Journal of Solid-State Circuits, vol. 41, No. 1, Jan. 2006, pp. 17-22.
Reiskarimian et al., "Analysis and Design of Two-Port N-Path Bandpass Filters With Embedded Phase Shifting", in IEEE Transactions on Circuits and Systems, vol. 63, No. 8, Aug. 2016, pp. 1-5.

(56) References Cited

OTHER PUBLICATIONS

Reiskarimian et al., "Design of All-Passive High-Order CMOS N-path Filters", in the Proceedings of IEEE Radio Frequency Integrated Circuits Symposium (RFIC), Phoenix, AZ, US, May 17-19, 2015, pp. 83-86.
Reiskarimian et al., "Magnetic-Free Non-Reciprocity Based on Staggered Commutation", in Nature Communications, vol. 7, No. 4, Apr. 2016, pp. 1-10.
Sabharwal et al., In-Band Full-Duplex Wireless: Challenges and Opportunities, in IEEE Journal on Selected Areas in Communications, vol. 32, No. 9, Sep. 2014, pp. 1637-1652.
Sahai et al., "On the Impact of Phase Noise on Active Cancellation in Wireless Full-Duplex", in IEEE Transactions on Vehicular Technology, vol. 62, No. 9, Nov. 2013, pp. 4494-4510.
Saito et al., "A Fully Integrated 60-GHz CMOS Transceiver Chipset Based on WiGig/IEEE 802.11AD with Built-In Self Calibration for Mobile Usage", in IEEE Journal of Solid-State Circuits, vol. 48, No. 12, Dec. 2013, pp. 3146-3159.
Sarkas et al., "An 18-Gb/s, Direct QPSK Modulation SiGe BiCMOS Transceiver for Last Mile Links in the 70-80 GHz band", in IEEE Journal of Solid-State Circuits, vol. 45, No. 10, Oct. 2010, pp. 1968-1980.
Schelstraete et al., "An Introduction to 802.11ac", White Paper, Quantenna Communications, Sep. 2011, pp. 1-10.
Sengupta et al., "Silicon Integrated 280 GHz Imaging Chipset with 4×4 SiGe Receiver Array and CMOS Source", in IEEE Transactions on Terahertz Science and Technology, vol. 5, No. 3., May 2015, pp. 427-437.
Sharma et al., "216 and 316 GHz 45 nm SOI CMOS Signal Sources Based on a Maximum-Gain Ring Oscillator Topology", in IEEE Transactions on Microwave Theory and Techniques, vol. 61, No. 1, Jan. 2013, pp. 1-3.
Shoji et al., "Magneto-Optical Isolator with Silicon Waveguides Fabricated by Direct Bonding", in Applied Physics Letter, vol. 92, issue 7, Jan. 2008, pp.
Skyworks Solutions Inc., "SKYFR-000709: 2110-2170 MHz Single Junction Robust Lead Circulator", Technical Paper, May 7, 2013, pp. 1-4.
Snow et al., "Transmit-Receive Duplexing Using Digital Beamforming System to Cancel Self-Interference", in IEEE Transactions on Microwave Theory and Techniques, vol. 59, No. 12, Dec. 2011, pp. 3494-3503.
Soer et al., "Unified Frequency-Domain Analysis of Switched-Series-Passive Mixers and Samplers", in IEEE Transactions on Circuits and Systems, vol. 57, No. 10, Oct. 2010, pp. 2618-2631.
Soljacic et al, "Nonlinear Photonic Crystal Microdevices for Optical Integration", in Optics Letters, vol. 28, No. 8, Apr. 15, 2003, pp. 637-639.
Sounas et al., "Giant Reciprocity at the Subwavelength Scale Using Angular Momentum-Biased Metamaterials", in Nature Communications, vol. 4, Sep. 2013, pp. 1-7.
Tabesh et al. "A 65NM CMOS 4-Element Sub-34 mW/Element 60GHz Phased Array Tranceiver", in IEEE Journal of Solid-State Circuits, vol. 46, No. 12, Dec. 2011, pp. 3018-3032.
Tanaka et al., "The Realization of Circulators Using Transistors", in the Proceedings of the IEEE, vol. 53, issue 3, Mar. 1965, pp. 260-267.
Tang et al., "Balanced RF-Circuit Based Self-Interference Cancellation for Full Duplex Communications", in Ad Hoc Networks, vol. 24, Jan. 2015, pp. 214-227.
Thomas et al., "Brodband Synthetic Transmission-Line N-Path Filter Design", in IEEE Transactions on Microwave Theory and Techniques, vol. 63, issue 10, Oct. 2015, pp. 3525-3536.
Tomkins et al., "A Zero-IF 60 GHz 65 nm CMOS Transceiver with Direct BPSK Modulation Demonstrating up to 6 gb/s Data Rates over a 2 m Wireless Link", in IEEE Journal of Solid-State Circuits, vol. 44, No. 8, Aug. 2009, pp. 2085-2099.

Tyagi et al., "An Advanced Low Power High Performance, Strained Channel 65nm Technology", in the Proceedings of the IEEE International Electron Devices Meetings, Washington, DC, US, Dec. 2005, pp. 1-4.
Van den Broek et al., "A Self-Interference Cancelling Front-End for In-Band Full-Duplex Wireless and its Phase Noise Performance", in the Proceedings of the IEEE Radio Frequency Integrated Circuits Symposium, Phoenix, AZ, US, May 2015, pp. 75-78.
Van den Broek et al., "A Self-Interference Cancelling Receiver for In-Band Full-Duplex Wireless with Low Distortion under Cancellation of Strong TX Leakage", in Proceedings of the IEEE Solid-State Circuits Conference, San Francisco, CA, US, Feb. 2015, pp. 1-8.
Van Den Broek et al., "An In-Band Full-Duplex Radio Receiver with Passive Vector Modulator Downmixer for Self-Interference Cancellation", in IEEE Journal of Solid State Circuits, vol. 50, No. 12, Dec. 2015, pp. 3003-3014.
Van Liempd et al., "An Electrical-Balance Duplexer for In-Band Full-Duplex with <- 85dBm In-Band Distortion at + 10dBm TX-Power", in the Proceedings of the European Solid-State Circuits Conference, Graz, AT, Sep. 14-18, 2015, pp. 1-5.
Vidojkovic et al., "A Low-Power Radio Chipset in 40 nm LP CMOS with Beamforming for 60 GHz High-Data-Rate Wireless Communication", in the Proceedings of the IEEE International Solid-State Circuits Conference, San Francisco, CA, US, Feb. 2013, pp. 236-237.
Vlasov et al., "High-Throughput Silicon Nanophotonic Wavelength-Insensitive Switch for On-Chip Optical Networks", in Nature Photonics, vol. 2, Mar. 2008, pp. 242-246.
Wang et al., "Fully Integrated 10-GHz Active Circulator and Quasi-Circulator Using Bridged-T Networks in Standard CMOS", in IEEE Transactions on Very Larg Scale Integration Systems, vol. 24, issue 10, Mar. 15, 2016, pp. 3184-3192.
Wang et al., "Gyrotropic Response in the Abscence of a Bias Field", in the Proceedings of the National Academy of Sciences, vol. 109, No. 33, May 17, 2012, pp. 13194-13197.
Wegener et al., "Broadband Near-Field Filters for Simultaneous Transmit and Receive in a Small Two-Dimensional Array", in the Proceedings of the IEEE International Microwave Symposium, Tampa Bay, FL, US, Jun. 2014, pp. 1-3.
Wegener et al., "High Isolation in Antenna Arrays for Simultaneous Transmit and Receive", in the Proceedings of the IEEE International Symposium on Phased Array Systems and Technology, Waltham, MA, US, Oct. 2013, pp. 593-597.
Wegener et al., "Simultaneous Transmit and Receive with a Small Planar Array", in the Proceedings of the International Microwave Symposium, Montreal, QC, CA, Jun. 2012, pp. 1-3.
Wells, J., "Faster Than Fiber: The Future of Multi-G/s Wireless", in IEEE Microwave Magazine, vol. 10, No. 3, May 2009, pp. 104-112.
Yang et al., "A Wideband Highly Integrated and Widely Tunable Transceiver for In-Band Full-Duplex Communication", in IEEE Journal of Solid State Circuits, vol. 50, No. 5, May 2015, pp. 1189-1202.
Yang et al., "A Widely Tunable Active Duplexing Transceiver with Same-Channel Concurrent RX/TX and 30db RX/TX Isolation", in the Proceedings of the IEEE Radio Frequency Integrated Circuits Symposium, Tampa, FL, US, Jun. 2014, pp. 321-324.
Yao et al., "65 GHz Doppler Sensor with On-Chip Atenna in 0.18um SiGe BiCOMS", in the Proceedings of the IEEE International Microwave Symposium, San Francisco, CA, US, Jun. 2006, pp. 1493-1496.
Yetisir et al., "Low-Profile UWB 2-Port Antenna with High Isolation", in IEEE Antennas Wireless Propagation Letters, vol. 13, Jan. 2014, pp. 55-58.
Yin, B. et al., "Full-Duplex in Large-Scale Wireless Systems", In Proceedings of the Asilomar Conference no Siganls, Systems, and Computers, Nov. 2013, pp. 1623-1627.
Yu et al., "Complete Optical Isolation Created by Indirect Interband Photonic Transitions", in Nature Photonics, vol. 3, Jan. 11, 2009, pp. 91-94.
Yuksel et al., "A Circuit-Level Model for Accurately Modeling 3rd Order Nonlinearity in CMOS Passive Mixers", in the Proceedings (56) References Cited

OTHER PUBLICATIONS of the IEEE Radio Frequency Integrated Circuits Symposium, Tampa, FL, US, Jun. 1-3, 2014, pp. 127-130.

Zander et al., "Riding the Data Tsunami in the Cloud: Myths and Challenges in Future Wireless Access", in IEEE Communications Magazine, vol. 51, No. 3, Mar. 2013, pp. 145-151.

Zanjani et al., "One-Way Phonon Isolation in Acoustic Waveguides", in Applied Physics Letters, vol. 104, Feb. 2014, pp. 1-5.

Zhang et al., "An Integrated CMOS Passive Self-Interference Mitigation Technique for FDD Radios", in IEEE Journal of Solid-State Circuits, vol. 50, No. 5, May 2015, pp. 1176-1188.

Zhang et al., "On-Chip Antennas for 60-GHz Radios in Silicon Technology", in IEEE Transactions on Electron Devices, vol. 52, No. 7, Jul. 2005, pp. 1664-1668.

Zhou et al., "Integrated Wideband Self-Interference Cancellation in the RF Domain for FDD and Full-Duplex Wireless", in IEEE Journal of Solid-State Circuits, vol. 50, No. 12, Dec. 2015, pp. 3015-3031.

Zhou et al., "Low-Noise Active Cancellation of Transmitter Leakage and Transmitter Noise in Broadband Wireless Receivers for FDD/Co-Existence", in IEEE Journal of Solid-State Circuits, vol. 49, No. 12, Dec. 2014, pp. 3046-3062.

Zhou et al., "Receiver with Integrated Magnetic-Free N-Path-Filter-Based Non-Reciprocal Circulator and Baseband Self-Interference Cancellation for Full-Duplex Wireless", in the Proceedings of the IEEE International Solid-State Circuits Conference, San Francisco, CA, US, Jan. 31-Feb. 4, 2016, pp. 178-180.

Zhou et al., "Reconfigurable Receiver with >20MHz Bandwidth Self-Interference Cancellation Suitable for FDD, Co-Existence and Full-Duplex Applications", in the Proceedings of the IEEE Solid-State Circuits Conference, San Francisco, CA, US, Feb. 2015, pp. 1-3.

Zhu et al., "Demystifying 60GHz Outdoor Picocells", in the Proceedings of the 20th Annual International Conference on Mobile Computing and Networking, Maui, HI, US, Sep. 2014, pp. 5-16.

\* cited by examiner

CIRCUITS AND METHODS FOR ANTENNA-BASED SELF-INTERFERENCE CANCELLATION

CROSS REFERENCE TO RELATED APPLICATION

This application claims the benefit of U.S. Provisional Patent Application No. 62/208,803, filed Aug. 23, 2015, which is hereby incorporated by reference herein in its entirety.

STATEMENT REGARDING GOVERNMENT FUNDED RESEARCH

This invention was made with government support under contract 1202488 awarded by the National Science Foundation. The government has certain rights in the invention.

BACKGROUND

In recent years, demand for wireless capacity has exploded as a result of integration of bandwidth hungry media applications in smart-phones and tablets. Industry predicts that demand for wireless capacity will continue to grow exponentially, and a one-thousand-fold increase in data traffic is projected from 2010 to 2020.

Same-channel full-duplex operation, also known as in-band full-duplex (IBFD) or simultaneous transmit and receive (STAR), is one way of improving wireless capacity. In a full-duplex system, a wireless transceiver transmits and receives at the same time on the same frequency channel.

The fundamental challenge in full-duplex operation is the strong leakage from the transmitter to its own receiver which is referred to as self interference (SI). Depending on the application, the SI can be more than a billion or even a trillion times stronger than the weak signal that the receiver is trying to receive. Consequently, it is desirable to somehow suppress the SI below the receiver noise floor for full-duplex operation.

Accordingly, new mechanism for self-interference cancellation are desirable.

SUMMARY

Circuits and methods for antenna-based self-interference cancellation are provided. In some embodiments, circuits for antenna-based self-interference cancellation are provided, the circuits comprising: a transmit antenna having a transmit port that receives a transmit signal; a receive antenna having a receive port that is cross-polarized with respect to the transmit port and having an auxiliary port that is co-polarized with respect to the transmit port; and a termination connected to the auxiliary port that reflects a signal received at the auxiliary port as a reflected signal, wherein the reflected signal counters interference caused by the transmit signal at the receive port.

DETAILED DESCRIPTION

Figure 1:
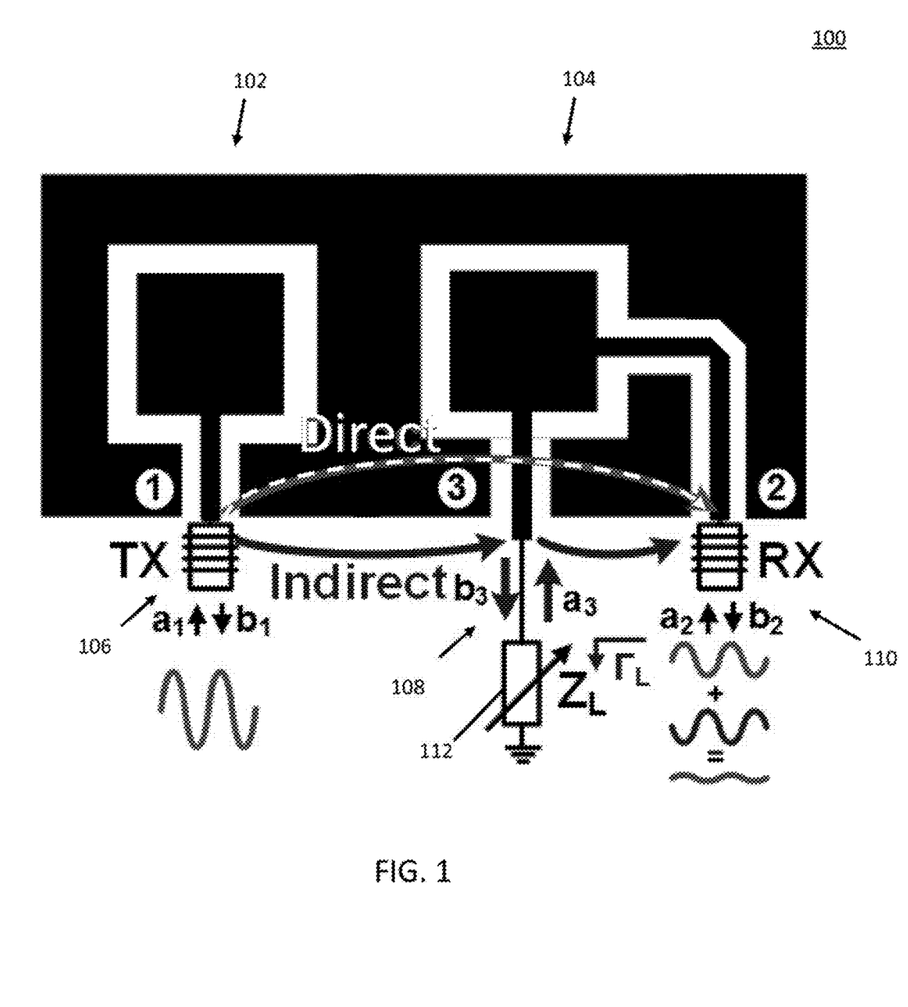
FIG. 1 is a schematic diagram of an example of a transmit and receive antenna pair having a transmit port, a receive port, and an auxiliary port with a reflective termination in accordance with some embodiments.

Turning to FIG. 1, an example of an antenna configuration that can be used to perform self-interference cancellation in accordance with some embodiments is shown. As illustrated, a slot-loop transmit antenna 102 and a slot-loop receive antenna 104 are provided as a transmit and receive antenna pair. In some embodiments, these antennas can be provided on-chip and tuned to 4.6 GHz (or any other suitable frequency).

The transmit antenna receives a transmission signal $a_1$ at a transmit port 106. The receive antenna provides a received signal $b_2$ at a receive port 110. Receive port 110 is cross-polarized with respect to transmit port 106. The receive antenna also has an auxiliary port 108 that is co-polarized with respect to transmit port 106. The auxiliary port is connected to a reconfigurable, reflective termination 112 that is configured to at least partially reflect a signal $b_3$ received at the auxiliary port as a signal $a_3$.

When the signal $a_1$ is transmitted by the transmit antenna, that signal directly and indirectly couples to the receive port. The indirect coupling occurs by way of the auxiliary port. More particularly, the transmitted signal $a_1$ results in signal $b_3$ being generated at the auxiliary port. Signal $b_3$ is then at least partially reflected by termination 112 as signal $a_3$. Signal $a_3$ then couples to the receive port. The result of the direct coupling and indirect coupling is that the impact of the signal reflected by the impedance (i.e., the indirect coupling) at least partially cancels the impact of signal $a_1$ from the transmit port on the signal $b_2$ at the receive port (i.e., the direct coupling). In some embodiments, this mechanism for self-interference cancellation is able achieve more than 50 dB of cancellation and maintain that level of cancellation in different environments by reconfiguring the termination to adapt to the different environments.

Figure 2:
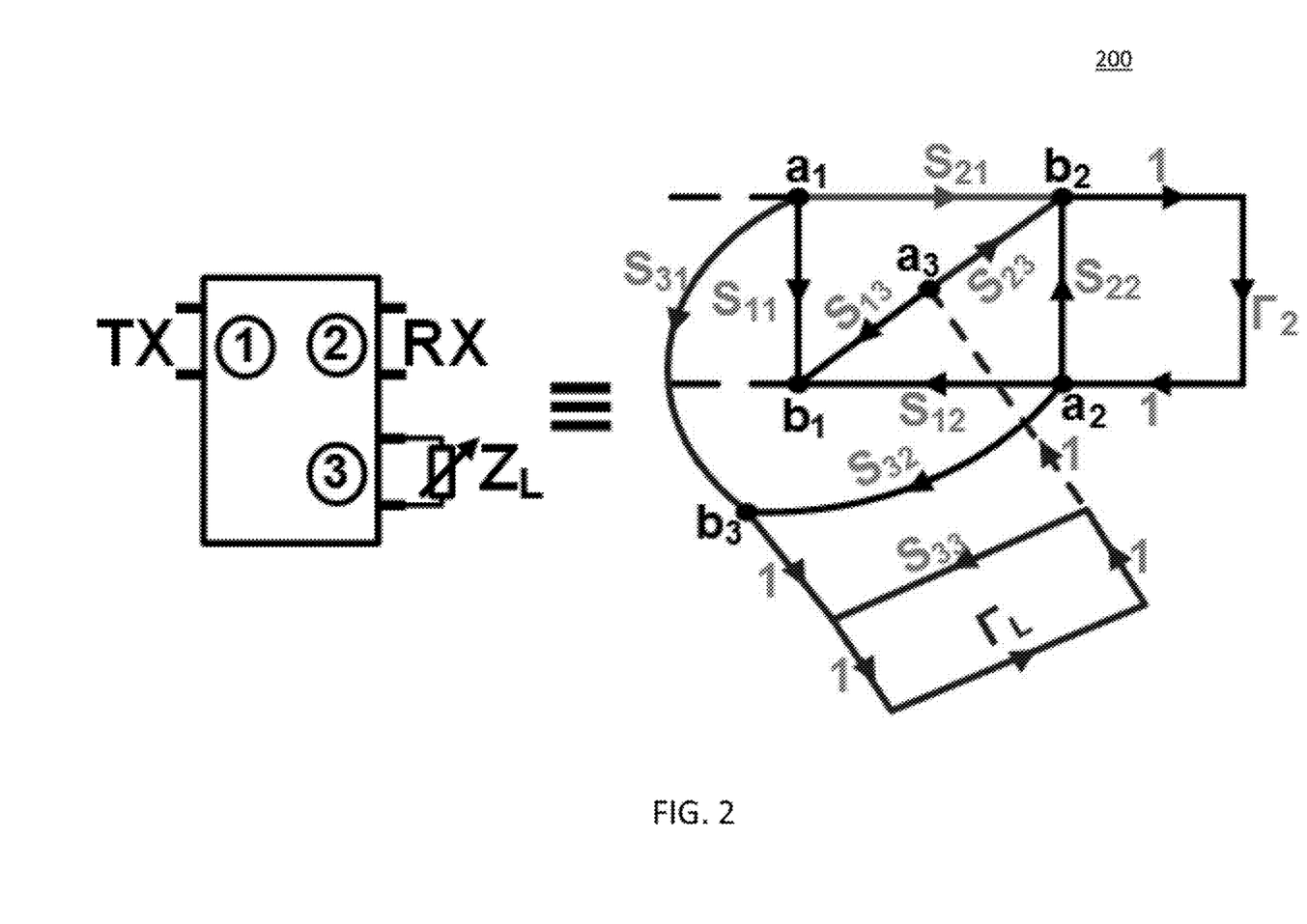
FIG. 2 is an example of a signal flow chart that describes the transmit and receive antenna pair with the reflective termination of FIG. 1 when viewed as a microwave network in accordance with some embodiments.

FIG. 2 shows an example 200 of a signal flow chart that describes this mechanism when transmit antenna and the receive antenna pair are viewed as a microwave network. From the flow chart, the total self-interference leakage from the transmit port to the receive port can be written as:

$$b_2 = \left(S_{21} + \frac{S_{23}S_{21}\Gamma_L}{1 - S_{33}\Gamma_L}\right)a_1 \quad (1)$$

where $a_1$ is the incident power wave at the transmit port and $b_2$ is the outgoing power wave at the receive port, $S_{21}$, $S_{31}$, $S_{23}$ and $S_{33}$ are the S-parameters of the 3-port antenna core (ports 1, 2, and 3 are transmit, receive, and auxiliary ports, respectively), and $\Gamma_L$ is the reflection coefficient of the termination at the auxiliary port. The first and second terms inside the brackets in equation (1) correspond to the transfer functions of the direct and indirect paths, respectively. When these two coupling terms are equal in magnitude and 180 degrees out of phase, the best self-interference cancellation, $b_2=0$, can be achieved. It should be noted that all the parameters in (1) are frequency dependent and the self-interference cancellation bandwidth depends on how well the equal magnitude and 180 degrees out of phase conditions are preserved across frequency. As mentioned above, in some embodiments, this mechanism for self-interference cancellation is able achieve more than 50 dB of cancellation and maintain that level of cancellation in different environments by reconfiguring the termination to adapt to the different environments.

In general, a cancellation path with 2N degrees of freedom can be used to achieve self-interference cancellation at N different frequencies. In fact, the 2N degrees of freedom can be utilized in multiple ways. The magnitude and the phase of the direct path can be synthesized at N separated frequencies or the magnitude, the phase, the slope of the magnitude, and the slope of the phase can be synthesized at N=2 frequencies.

In order to design a transmit and receive antenna pair that is configured to perform self-interference cancellation, three general steps can be performed.

First, the antenna pair can be designed and simulated in an electromagnetic field solver, such as HyperLynx 3D EM available from Mentor Graphics of Wilsonville, Oreg. This step includes designing, optimizing, and creating a transmit antenna (which can be a rectangular slot loop antenna, or any other suitable antenna), and then creating an identical, 90-degrees-rotated receive antenna and adding the auxiliary port. The antennas can be designed and optimized as known in the art, for example as described in J. W. Greiser, "Coplanar stripline antenna," Microwave Journal, vol. 19, no. 10, pp. 47-49, 1976, and/or Y. Zhang, M. Sun, and L. Guo, "On-chip antennas for 60-GHz radios in silicon technology," IEEE Transactions on Electron Devices, vol. 52, no. 7, pp. 1664-1668, July 2005, each of which is hereby incorporated by reference herein in its entirety.

Figure 3:
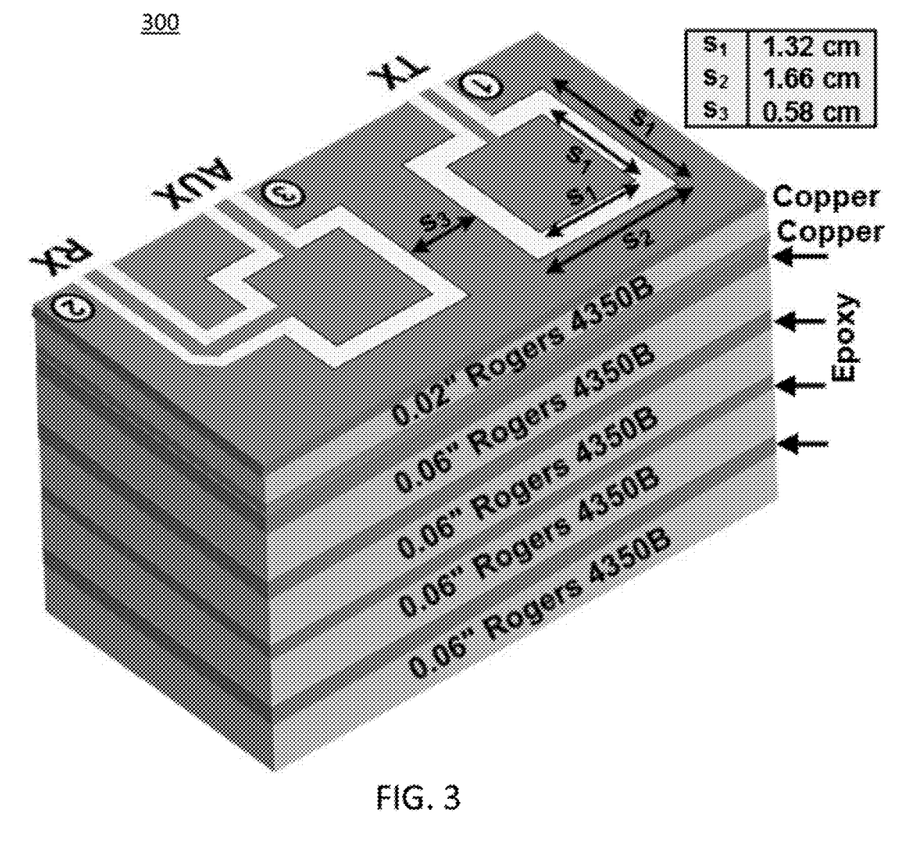
FIG. 3 is a perspective-view illustration of an example of a transmit and receive antenna pair implemented in a printed circuit board in accordance with some embodiments.

FIG. 3 shows an example 300 of antenna dimensions and a PCB cross-section that can be used for the antenna pair in accordance with some embodiments.

Once the transmit antenna and the receive antenna are finalized, the three port network formed by the antennas can be simulated in the electromagnetic field solver to provide the S-parameters $S_{21}$, $S_{31}$, $S_{23}$, and $S_{33}$.

Next, during a second step, the design parameters for the required reflection at the auxiliary port of the antenna pair can be calculated across frequency (e.g., 4 GHz to 5.5 GHz) based on the S-parameters $S_{21}$, $S_{31}$, $S_{23}$, and $S_{33}$.

The reflection by the termination at the auxiliary port required for self-interference cancellation can be described by a required reflection coefficient, $\Gamma_{L,req}$, as follows:

$$\Gamma_{L,req} = \frac{S_{21}}{S_{21}S_{33} - S_{23}S_{31}} \quad (2)$$

Because the $\Gamma_{L,req}$ for self-interference cancellation is determined by the antenna pair, a trade-off between the required $\Gamma_{L,req}$ and the antenna performance parameters such as gain, bandwidth, and efficiency is introduced. To break this trade-off, the feed line length can be used as another parameter to optimize the $\Gamma_{L,req}$ for achieving wideband self-interference cancellation.

Figure 4:
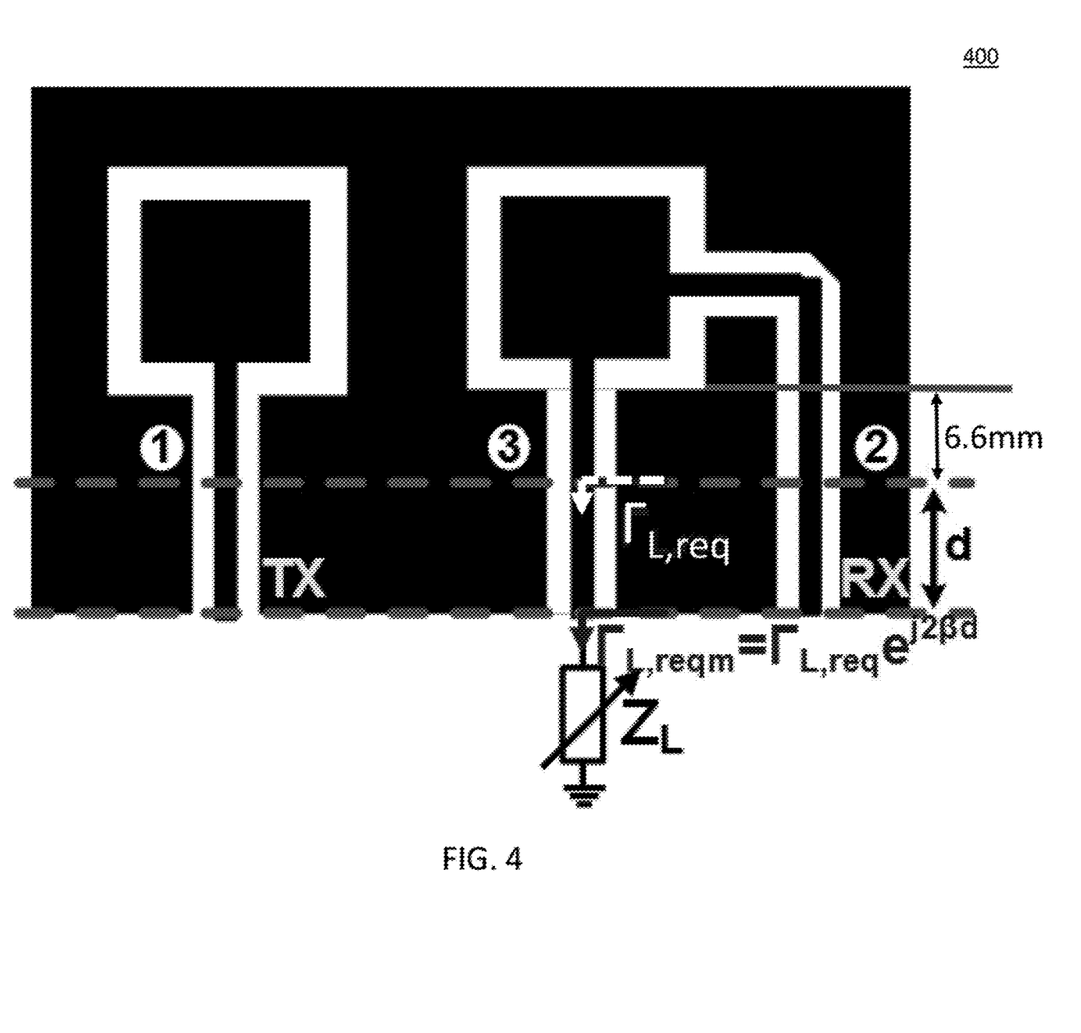
FIG. 4 is a schematic diagram of an example of a transmit and receive antenna pair having a transmit port, a receive port, and an auxiliary port with a reflective termination showing a feed line length d in accordance with some embodiments.

FIG. 4 shows an illustration of the feed-line length, d, for the antenna pair. As shown, d is measured from a point $0.24\lambda$ (e.g., 6.6 mm in the example shown) from the antenna loop to the termination. Although $0.24\lambda$ is provided herein as an example, any other suitable dimension can be used in some embodiments.

Neglecting transmission line loss, $\Gamma_{L,req}$ can be modified as follows due to the effect of extending the feed line length:

$$\Gamma_{L,reqm}(d) = \frac{S_{21}e^{j2\beta d}}{S_{21}S_{33} - S_{23}S_{31}} \quad (3)$$

where $\beta$ is the propagation constant for the feed line (e.g., $\beta=2\pi/\lambda$).

Using equation (3), modified required reflection coefficient, $\Gamma_{L,reqm}$, values can be calculated across frequency (e.g., 4 GHz to 5.5 GHz) for different values of feed line length d (e.g., in $0.05\lambda$ steps between $0.05\lambda$ and $0.25\lambda$) using the S-parameters $S_{21}$, $S_{31}$, $S_{23}$, and $S_{33}$.

Conductance and susceptance are physically more meaningful design parameters than the required reflection coefficient since they can be readily expressed in terms of the parameters of the lumped components that would be used to implement the variable termination. The required conductance, $G_{L,reqm}$, and susceptance, $B_{L,reqm}$, of the variable termination can be calculated using the following equations:

$$G_{L,reqm} = Re\left\{Y_0 \frac{1 - \Gamma_{L,reqm}}{1 + \Gamma_{L,reqm}}\right\} \quad (4)$$

$$B_{L,reqm} = Imag\left\{Y_0 \frac{1 - \Gamma_{L,reqm}}{1 + \Gamma_{L,reqm}}\right\} \quad (5)$$

where $Y_0$ is the characteristic admittance (e.g., 20 mS for 50 ohm characteristic impedance ($Z_0$) RF systems). Thus, for the values of $\Gamma_{L,reqm}$ calculated across frequency for each value of d using equation (3), values for $G_{L,reqm}$ and $B_{L,reqm}$ can be determined. Using the values of $G_{L,reqm}$ and $B_{L,reqm}$ for each value of d, the admittance, $Y_{L,reqm}$, can be plotted on a Y-Chart. An example 500 of a Y-Chart that can be produced in some embodiments is shown in FIG. 5.

Figure 5:
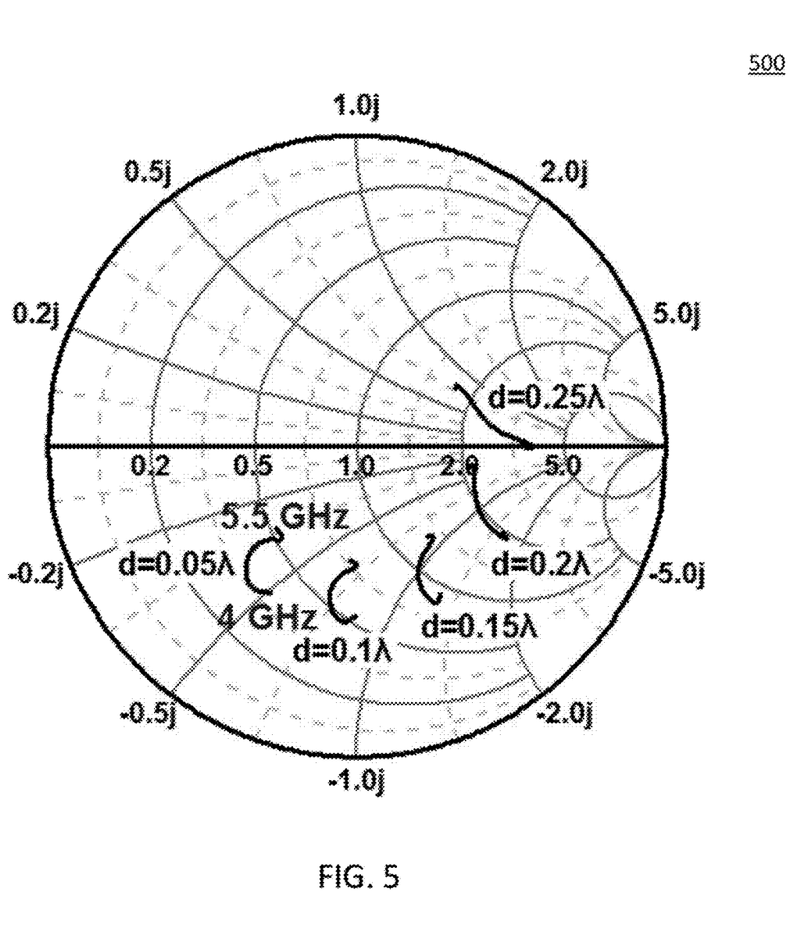
FIG. 5 is an example of a Y-chart showing admittance values for different values of feed line length d over a frequency range of 4 GHz to 5.5 GHz in accordance with some embodiments.

As illustrated in FIG. 5, the required admittance $Y_{L,reqm}$ flattens out and its real part ($G_{L,reqm}$) gets larger with increasing d.

To make the required conductance, $G_{L,reqm}$, frequency independent, d can be set so that $Y_{L,reqm}$ falls on a constant conductance circle (i.e., has the same value of $G_{L,reqm}$) across the desired frequency band. In such a case, the slope of $G_{L,reqm}$ across the desired frequency band would be zero. Any suitable value of d that can meet or approximate this requirement can be used in some embodiments. As shown in FIG. 5, d equal to 0.15λ approximates the constant conductance circle 1.0. Thus, for example, in some embodiments, a field line length d of 4 mm can be used.

Once the value of d is selected, the corresponding values for $G_{reqm}$, $B_{reqm}$, the slope of $G_{reqm}$, and the slope of $B_{reqm}$ from the Y-chart can be used as the design parameters for the required reflection at the auxiliary port of the antenna pair.

In the third step, a higher-order reflective termination impedance can be designed to synthesize the values for $G_{reqm}$, $B_{reqm}$, the slope of $G_{reqm}$, and the slope of $B_{reqm}$ at multiple frequency points.

Figure 6:
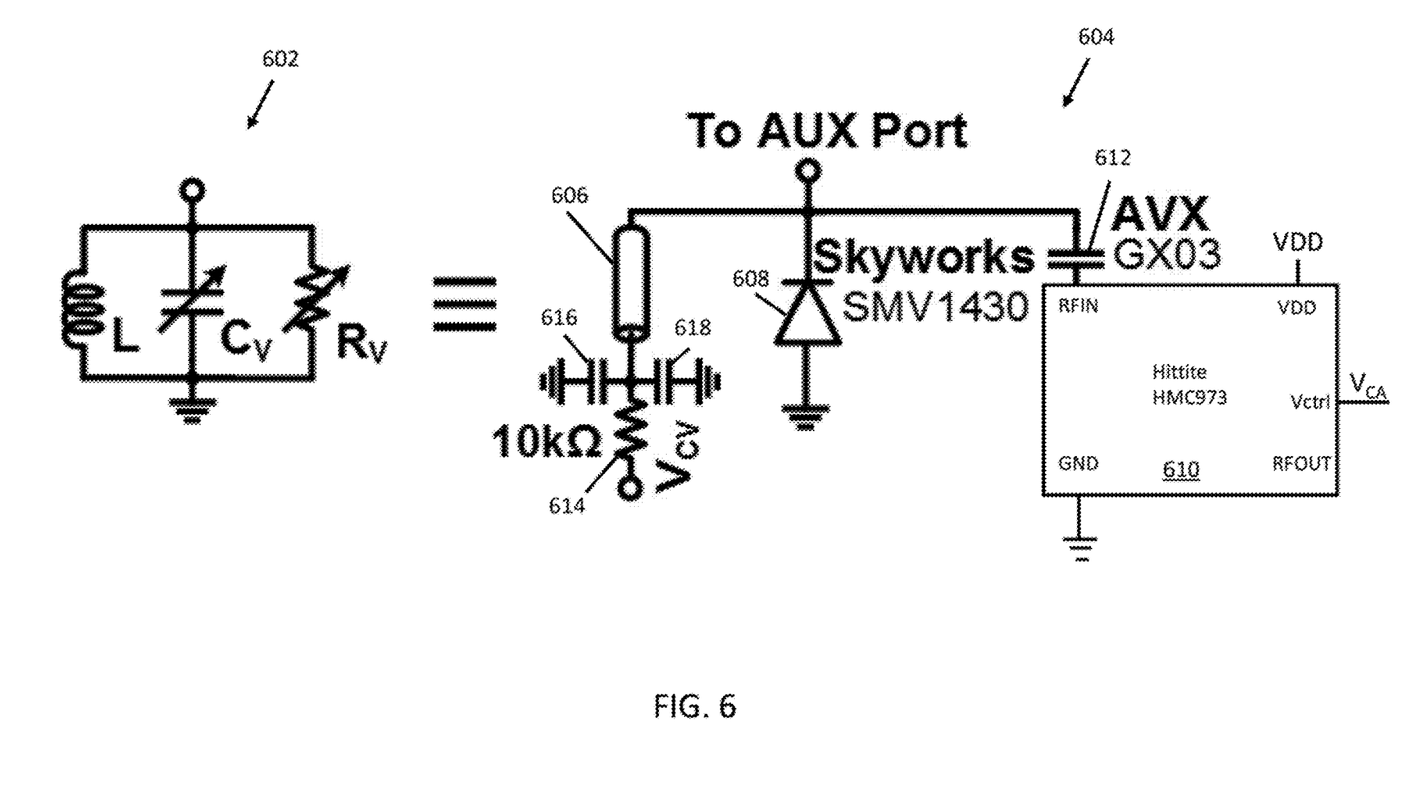
FIG. 6 shows two schematic diagrams of examples of a variable termination that can be connected to an auxiliary port of a transmit and receive antenna pair in accordance with some embodiments.

In some embodiments, a parallel RLC termination (as shown in FIG. 6) can be used as the termination at the auxiliary port. A parallel RLC termination with a variable L, a variable C, and a variable R has three degrees of freedom to control $G_{L,synth}$, $B_{L,synth}$ and the slope of $B_{L,synth}$ at a given frequency, f. With a parallel RLC termination, the slope of $G_{L,synth}$ is zero, which matches the slope of $G_{L,reqm}$ being zero across the desired frequency band based on the selection of d.

The re-configurability of the L, the C, and the R allows tracking of $G_{L,reqm}$, $B_{L,reqm}$ and the slope of $B_{L,reqm}$ as the environment changes. $B_{L,synth}$, the slope of $B_{L,synth}$ ($\partial B_{L,synth}/\partial f$), and $G_{L,synth}$ can be expressed as:

$$B_{L,synth} = 2\pi f C\left(1 - \frac{f_r^2}{f^2}\right) \quad (6)$$

$$\frac{\partial B_{L,synth}}{\partial f} = 2C\left(\pi + \frac{f_r^2}{f^2}\right) \quad (7)$$

$$G_{L,synth} = \frac{1}{R} \quad (8)$$

where $f_r$ is the resonance frequency of the termination given by $1/2\pi\sqrt{LC}$, f is the frequency of operation, C is the center value of the variable capacitor ($C_v$ in FIG. 6), L is the value of the inductor (L in FIG. 6), and R is the center value of the variable resistor ($R_v$ in FIG. 6).

In some embodiments, the value L can be set to a fixed value so that the slope of $B_{L,synth}$ replicates the slope of $B_{L,reqm}$ dictated by the electromagnetic field simulation of the antenna pair without considering nearby reflectors. Should self-interference cancellation be lost due to a metallic close-in reflector, it may be possible to recover the self-interference cancellation by just changing the values of R and C. However, if a strong reflection necessitates controlling the magnitude and slope of $B_{L,synth}$ independently, the value of L may need to be varied. In order to implement a variable inductor, in some embodiments, switches to ground can be placed at different locations on a shorted stub acting as the inductor to change the apparent length of the shortened stub.

FIG. 3 presents the transmit and receive antenna design and the cross-section of the PCB board. While particular dimensions are shown in FIG. 3, any suitable dimensions can be used in some embodiments. In some embodiments, slot antennas can be chosen over other antennas (such as patch antennas) because they provide wide bandwidth and also allow integration of the proposed technique on silicon at millimeter/sub-millimeter-wave frequencies. In some embodiments, 20 mils Rogers 4350B (available from Rogers Corporation, Rogers, Conn.) ($\epsilon_r$=3.48, tan(δ)=0.0037 at 10 GHz) can be used as the substrate material. The transmit and receive antennas are implemented on the top copper layer. The bottom copper is assigned as the ground layer and is cut away under the antennas. A 240 mils superstrate layer is employed under the antennas to focus the radiation to the backside. Four 60 mils Rogers 4350B layers are glued together with very thin layers of non-conductive epoxy (dielectric constant of ≈3.6) to form the superstrate layer (FIG. 3).

As shown in FIG. 6, in some embodiments, a reflective parallel RLC termination can implemented using a 3.5 mm shorted stub ($Z_0$=50 ohms) as the fixed inductor, a Skyworks SMV1430-079LF abrupt junction varactor diode (available from Skyworks Solutions, Inc. of Woburn, Mass.) as the variable capacitor, and a Hittite HMC973LP3E voltage controlled attenuator (available from Analog Devices, Inc. of Norwood, Mass.) as the variable resistor. In some embodiments, any other suitable components can be used to provide the inductor, variable capacitor, and variable resistor illustrated.

As shown in FIG. 6, the shorted stub is connected on one side to the auxiliary port of the receive antenna and connected on the other side to a pair of capacitors (which can have any suitable value, such as 0.1 µF) to ground and a resistor (which can have any suitable values, such as 10 k ohm) to a control voltage ($V_{CV}$, which can have any suitable value, such as 0 to 30V).

The varactor diode is tunable from 0.31 pF to 1.24 pF (Q=1680 at 50 MHz and 4V) and controlled through the resistor at the end of the shorted stub.

The HMC973LP3E is a 0.5-6 GHz reflection type attenuator which features a variable FET-based shunt-resistor to ground between its RF input pin (RFIN) and its RF output pin (RFOUT). This shunt-resistor is controlled by an analog gate voltage ($V_{CA}$, which can have any suitable value, such as 0 to 5V) provided at control voltage pin ($V_{ctrl}$) of the HMC973LP3E. The HMC973LP3E can be used as a variable resistance by leaving the RF output pin floating.

In some embodiments, the attenuator can be DC isolated using an AVX GX03 ultra-low-insertion-loss (less than 0.2 dB up to 16 GHz) 0.1 µF capacitor (available from AVX Corporation of Fountain Inn, S.C.). In some embodiments, any other suitable capacitor can be used to perform this DC isolation.

In some embodiments, the antenna pair can be manufactured to occupy 4.88 cm×6.4 cm×0.66 cm of space.

Figure 7:
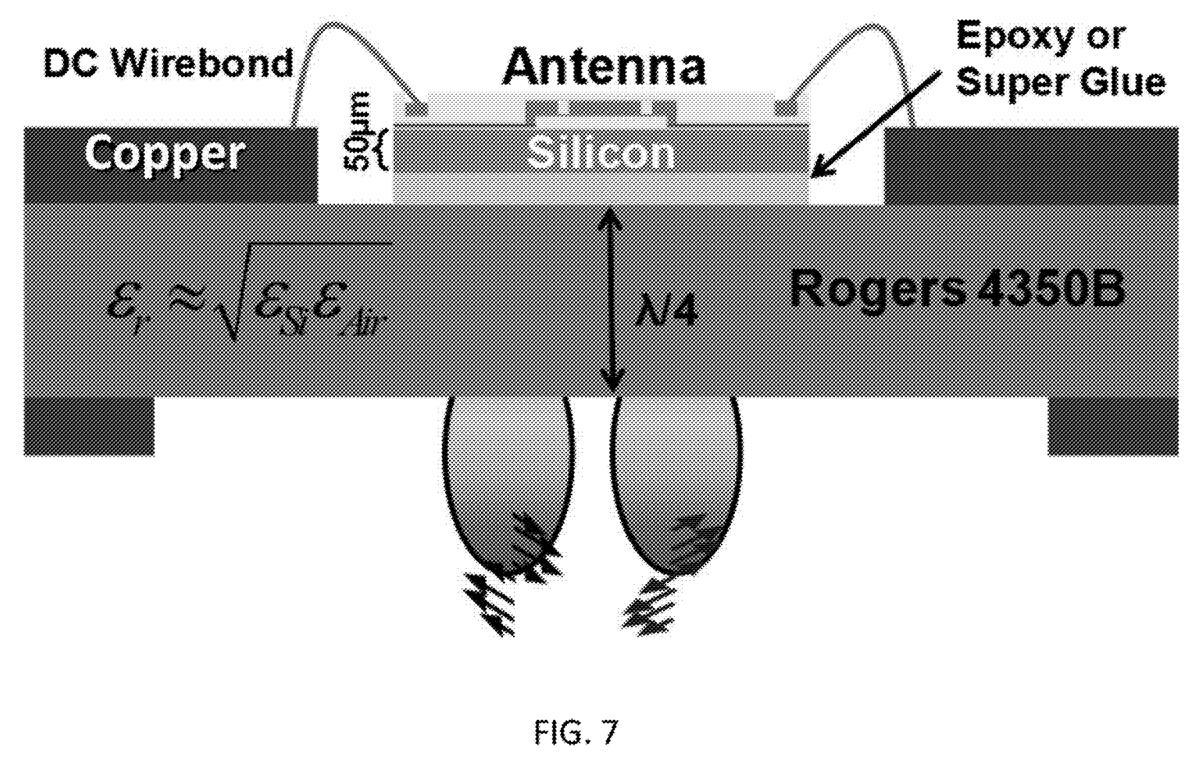
FIG. 7 is a cross-sectional view of an example of an antenna mounted on-chip with transmit and receive antenna beams at the bottom of the chip in accordance with some embodiments.
Figure 8:
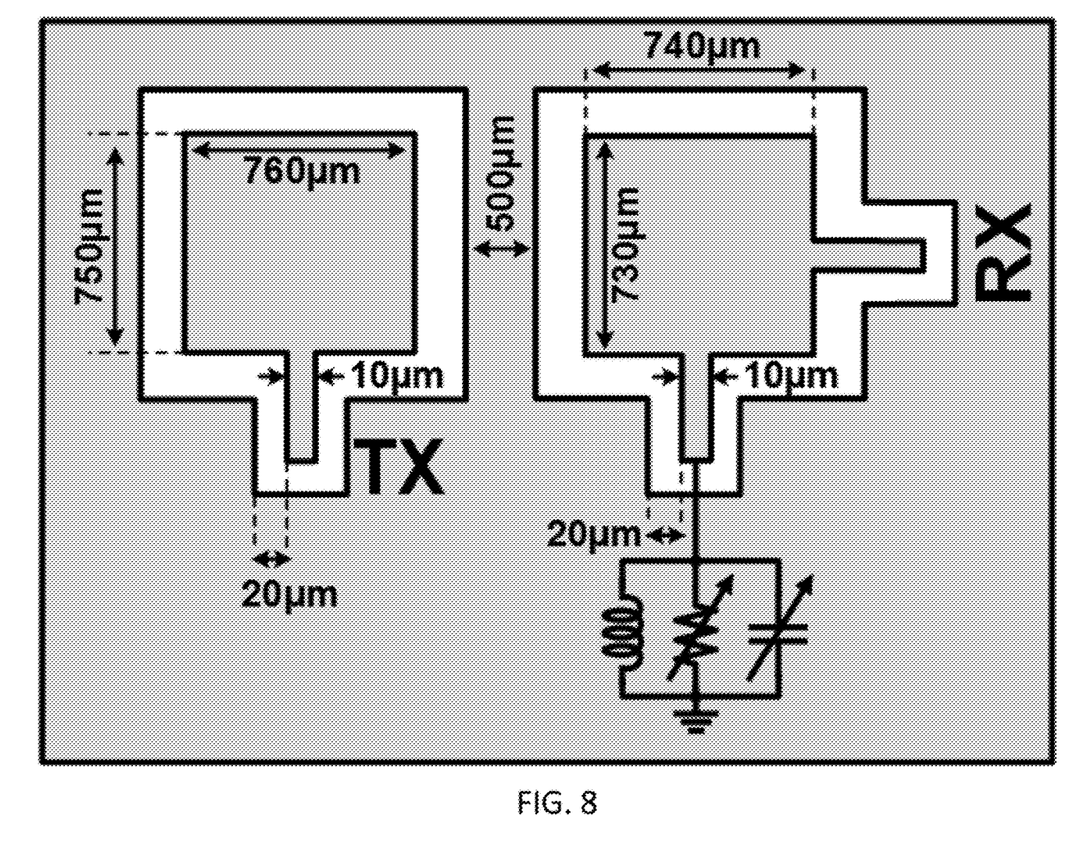
FIG. 8 is a schematic diagram of an example of a transmit and receive antenna pair having a transmit port, a receive port, and an auxiliary port with a reflective termination for a 60 GHz implementation in accordance with some embodiments.
Figure 9:
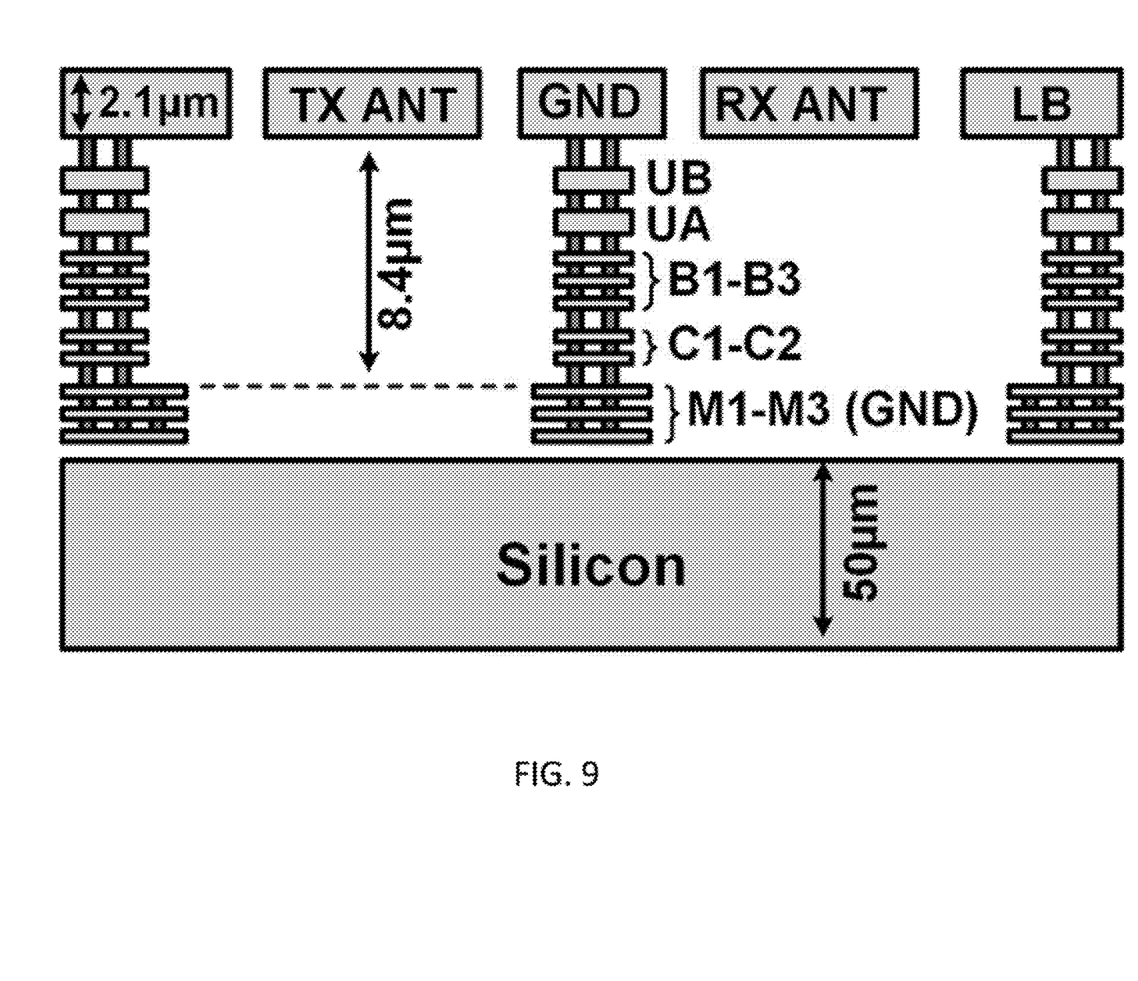
FIG. 9 is a cross-sectional view of an example of a transmit and receive antenna pair implemented in the IBM 45 nm SOI CMOS process in accordance with some embodiments.

FIGS. 7, 8, and 9 illustrate an example of an on-chip implementation of a slot loop antenna pair that implements self-interference cancellation in accordance with some embodiments.

Turning to FIG. 7, an example of a cross-section of the chip-antenna integration is shown. As illustrated, in some embodiments, the substrate can be made to be 50 µm (or any other suitable size) thick. As also illustrated, the radiation from/to the antenna is via the bottom. A chip containing the antennas as well as a mm-wave transceiver can be mounted on a PCB (e.g., a Rogers 4350B available from Rogers Corporation of Rogers, Conn.) with $\epsilon_r=\sqrt{\epsilon_{air}\epsilon_{Si}}\approx 3.45$ and λ/4 thickness using a non-conductive epoxy or superglue ($\epsilon_r\approx 3.5$ for both) which can be as thin as ~50 µm. Thus, the wave impedance in silicon is matched to the wave impedance in the air, improving the antenna efficiency.

Turning to FIGS. 8 and 9, examples of an antenna pair for a 60 GHz implementation of the described self-interference cancellation technique in the IBM 45 nm SOI CMOS process in accordance with some embodiments is shown.

As shown in FIG. 8, the antennas in the antenna pair can have the dimensions illustrated in some embodiments.

As shown in FIG. 9, the IBM 45 nm SOI CMOS process offers eleven metal layers, including a 2.1 µm top-most aluminum layer (LB) in which the transmit antenna and the receive antenna can be implemented in some embodiments. The antennas can be fed using conductor-backed CPW lines in LB with an M1-M3 bottom ground stack and M1-LB side grounds. As illustrated, the ground layer can be removed under the antennas. As illustrated in FIG. 7, the 60 GHz T/R antenna core can be implemented on a 650 µm Rogers 4350B superstrate layer assuming the epoxy thickness of 50 µm.

While specific dimensions, values, and components are described herein for purposes of illustrating some embodiments, it should be apparent to one of ordinary skill in the art that these dimensions, values, and/or components can be altered in some embodiments. For example, in some embodiments, the dimensions described for the antennas, feed line lengths, substrate thicknesses, glue thicknesses, and/or any other dimensions can be changed. As another example, in some embodiments, the values for inductances, resistances, capacitances, and/or any other values can be changed. As still another example, in some embodiments, the components for any inductors, resistors, capacitors, substrates, varactors, ground planes, superstrates, attenuators, and/or any other components can be changed.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for antenna-based self-interference cancellation, comprising:
   a transmit antenna having a transmit port that receives a transmit signal;
   a receive antenna having a receive port that is cross-polarized with respect to the transmit port and having an auxiliary port that is co-polarized with respect to the transmit port; and
   a termination connected to the auxiliary port that reflects a signal received at the auxiliary port as a reflected signal, wherein the reflected signal counters interference caused by the transmit signal at the receive port.

2. The circuit of claim 1, wherein the termination is formed from a parallel combination of a resistance, an inductance, and a capacitance.

3. The circuit of claim 2, wherein the inductance is fixed.

4. The circuit of claim 3, wherein the inductance is implemented using a transmission line.

5. The circuit of claim 2, wherein the resistance is implemented using a voltage controlled attenuator.

6. The circuit of claim 2, wherein the capacitance is implemented using a varactor diode.

7. The circuit of claim 1, wherein the transmit port, the receive port, and the auxiliary port each have non-zero feed line length.

8. The circuit of claim 1, wherein a slope of conductance synthesized by the termination over a frequency range is substantially zero.

* * * * *